United States Patent
Siddappa et al.

(10) Patent No.: US 11,829,807 B2
(45) Date of Patent: Nov. 28, 2023

(54) METHOD AND APPARATUS FOR PREVENTING TASK-SIGNAL DEADLOCK DUE TO CONTENTION FOR MUTEX IN RTOS

(71) Applicant: Samsung Electronics Co., Ltd., Suwon-si (KR)

(72) Inventors: Raju Udava Siddappa, Bangalore (IN); Chandan Kumar, Bangalore (IN); Sudharshan Rao B, Bangalore (IN); Tushar Vrind, Bangalore (IN); Venkata Raju Indukuri, Bangalore (IN)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 376 days.

(21) Appl. No.: 17/038,994

(22) Filed: Sep. 30, 2020

(65) Prior Publication Data
US 2021/0357272 A1    Nov. 18, 2021

(30) Foreign Application Priority Data
May 15, 2020 (IN) .............................. 202041020590

(51) Int. Cl.
*G06F 9/46*    (2006.01)
*G06F 9/52*    (2006.01)
*G06F 9/48*    (2006.01)

(52) U.S. Cl.
CPC ............ *G06F 9/524* (2013.01); *G06F 9/4831* (2013.01)

(58) Field of Classification Search
CPC .............................. G06F 9/524; G06F 9/4831
See application file for complete search history.

(56) References Cited

U.S. PATENT DOCUMENTS

| | | | |
|---|---|---|---|
| 2010/0138685 A1* | 6/2010 | Kass ....................... | G06F 9/526 714/2 |
| 2014/0281092 A1* | 9/2014 | Jayakumar .......... | G06F 11/0772 710/269 |
| 2015/0074311 A1* | 3/2015 | McKenney ........... | G06F 9/4812 710/269 |
| 2015/0293793 A1* | 10/2015 | Vrind .................... | G06F 9/4887 718/103 |

(Continued)

OTHER PUBLICATIONS

Signal-Safe Locks (website) <https://locklessinc.com/articles/signalsafe_locks/> last accessed Sep. 9, 2020.

(Continued)

*Primary Examiner* — Tammy E Lee
(74) *Attorney, Agent, or Firm* — Harness, Dickey & Pierce, P.L.C.

(57) ABSTRACT

A method for preventing a task-signal deadlock arising due to contention for a mutex in a real-time operating system (RTOS) includes detecting, by a processing unit, a signal notification sent to a task for execution of a signal handler; identifying, by the processing unit, a mutex to be acquired by the signal handler, when the signal notification is detected; determining whether the identified mutex has been acquired by the task; and utilizing, by the processing unit, an alternative stack for execution of the signal handler, in response to determining that the mutex has been acquired by the task, for preventing a task-signal deadlock during the execution.

18 Claims, 13 Drawing Sheets

(56) References Cited

U.S. PATENT DOCUMENTS

2016/0381050 A1* 12/2016 Shanbhogue ....... G06F 12/1036
  726/23
2018/0203722 A1* 7/2018 Udava ................... G06F 9/4843

OTHER PUBLICATIONS

Linux manual page (website) <http://man7.org/linux/man-pages/man2/sigaltstack.2.html> last accessed Sep. 9, 2020.

* cited by examiner

METHOD AND APPARATUS FOR PREVENTING TASK-SIGNAL DEADLOCK DUE TO CONTENTION FOR MUTEX IN RTOS

CROSS-REFERENCE TO RELATED APPLICATION

This application claims priority under 35 U.S.C. § 119 to Indian Patent Application No. 202041020590, filed on May 15, 2020, in the Indian Patent Office, the entire contents of which are incorporated herein by reference.

RELATED ART

1. Technical Field

The present subject matter is related in general to Real-time Operating Systems (RTOSs) and, more particularly, but not exclusively, to a method and apparatus for preventing a task-signal deadlock arising due to contention for a mutex in a RTOS.

2. Background

A RTOS is an Operating System (OS) intended to serve real-time applications that process data received by the RTOS. In RTOS implementation of a design, a program is divided into different independent blocks or entities called tasks. For embedded systems built on top of the RTOS, each of the blocks may run continuously (e.g., in infinite loop or indefinitely). A signal is a notification sent to a task and may interrupt that task from its ongoing activities. In order to process the received signal, a signal-handler is invoked for the task. Tasks, signals and Interrupt Service Routines (ISRs) are typical execution components of any RTOS. Tasks represent fundamental blocks of execution. Signals can be termed as task level interrupts. In that analogy, signal handlers for a task are equivalent to an ISR for a processor. 'Signals' are often used for higher priority asynchronous activities that needs to be executed at individual task priority level. In RTOS, to save stack memory, signal handlers execute on task-stack. However, the signal handlers, like ISR, are not allowed to suspend context waiting for un-available resource.

In RTOS, a mutex is a binary variable whose purpose is to provide synchronization mechanism. It provides mutual exclusion to a critical section or resource. Only one task can execute a particular code section at a time. Such code blocks are termed as critical section. For execution, a task may acquire a mutex. The acquiring task is now said to own this mutex (referred to as Mutex owner task) till the task explicitly releases it. In a priority-based system, consider a lower priority task which has held and suspended on a mutex. When a higher priority task is to be executed and a need arises to acquire the same mutex that is already acquired by the lower priority task, priority inversion may occur. In the priority inversion, the higher priority task needs to wait until the lower priority task releases a resource protected by mutex. The wait can be further delayed if tasks of intermediate priority monopolize the processor for a longer duration. Priority inheritance is one of a number of techniques implemented to solve the problem of priority inversion. In the priority inheritance, whenever a high priority task has to wait for some resource shared with an executing low priority task, the low priority task is temporarily assigned the priority of the highest waiting priority task for the duration of its own use of the shared resource. This leads to keeping medium priority tasks from pre-empting the low priority task, and thereby affects the waiting high priority task as well. Once the resource is released, the low priority task continues at its original priority level. Upon execution of the lower priority task and release of the mutex, the higher priority task may acquire the released mutex to resume the higher priority task's execution. The priority inheritance may solve the problem of the priority inversion. However, a rule associated with priority of execution i.e., executing higher priority task first and then executing the lower priority task, may be compromised.

Further, consider when a task context is in the critical region and holds a mutex. In the critical region, the task may send a signal to itself or another task may signal the task that has held mutex, thus enabling a signal handler for the signalled task to get invoked. In such case, context of the task and context of the signal handler are stored in same stack and execution of the signal handler is of higher priority. Hence, the task may suspend to resume the signal handler and context of the signal handler may be stored above context of the task. When the signal handler tries to acquire the mutex owned by the task context, it is required that the task needs to release the mutex for execution of the signal handler. Execution of the task, for the release of the mutex, may not be possible since the context of the signal handler is stored in the same stack where the context of the task is stored. Also, the signal handler may not be able to resume execution due to contention of the mutex. Such scenario gives rise to task-signal deadlock and invocation of signal handler may be a problem when the task is owning the mutex.

For handling task-signal deadlock, some of existing technique includes checking if the mutex is acquired by the task and deferring the signal handler execution. By deferring the signal handler, the task executes until mutex is released; a subsequently deferred signal is posted to task. However, in such techniques, signals are often or, alternatively, always blindly deferred without checking if a signal handler is trying to acquire the same mutex acquired by the task. It could be possible that signal handler may not request for held mutex during its course of execution. Deferring of the signal may not be necessary if different mutex is to be acquired. But, said technique may defer the signal handler irrespective of the mutex to be acquired and irrespective of action items associated with the signal handler. Also, in some techniques, there may be a need for the developer to explicitly and manually indicate that the said signal handler isn't dependent on the mutex in use by the task, during the task-signal deadlock.

Other existing techniques include using a new alternate stack for storing the context of the signal handler. In such techniques, separate stacks may be utilized for the task and the signal handler leading to additional stack memory space. Utilization of the new alternate stack may be done using an API which specifies to the RTOS that it is going into protected mode (mutex acquire-release phase). During this phase, if signal handlers are required to be set-executed, then such signal handlers are posted on to a new stack.

The information disclosed in this background of the disclosure section is only for enhancement of understanding of the general background of the invention and should not be taken as an acknowledgement or any form of suggestion that this information forms the prior art already known to a person skilled in the art.

SUMMARY

According to at least some example embodiments of the inventive concepts, a method for preventing a task-signal deadlock arising due to contention for a mutex in a real-time operating system (RTOS) includes detecting, by a processing unit, a signal notification sent to a task for execution of a signal handler; identifying, by the processing unit, a mutex to be acquired by the signal handler, when the signal notification is detected; determining whether the identified mutex has been acquired by the task; and utilizing, by the processing unit, an alternative stack for execution of the signal handler, in response to determining that the mutex has been acquired by the task, for preventing a task-signal deadlock during the execution.

According to at least some example embodiments of the inventive concepts, a processing apparatus for preventing a task-signal deadlock arising due to contention for a mutex in a real-time operating system (RTOS) includes a processor; and a memory communicatively coupled to the processor, wherein the memory stores processor-executable instructions, which, when executed by the processor, cause the processor to detect a signal notification sent to a task, for execution of a signal handler, identify a mutex to be acquired by the signal handler when the signal notification is detected, determine whether the mutex has been acquired by the task, and prevent the task-signal deadlock by using an alternative stack for execution of the signal handler, in response to determining that the mutex has been acquired by the task, wherein the alternative stack is selected from a first number of additional stacks in the RTOS.

According to at least some example embodiments of the inventive concepts, a method for preventing a task-signal deadlock arising due to contention for a mutex in a Real-time Operating System (RTOS) includes detecting, by a processing unit, a signal notification sent to a task for execution of a signal handler, wherein context of the signal handler is allocated above pre-emption point of the task, in a stack associated with the task; identifying, by the processing unit, a mutex to be acquired by the signal handler, when the signal notification is detected; determining whether the identified mutex has been acquired by the task; creating, by the processing unit, a copy of the context of the signal handler in response to determining that that the mutex has been acquired by the task; executing, by the processing unit, the task such that the task releases the mutex; and initiating, by the processing unit, execution of the signal handler based on a current position of stack pointer of the task with respect to a starting point of the context of the signal handler in the stack, wherein when the current position is above the starting point, the execution of the signal handler includes creating a copy of a portion of a context associated with the task that is located between the starting point and the current position, restoring the context of the signal handler in the stack using the copy of the context of the signal handler, for execution of the signal handler, and restoring the context associated with the task into the stack using the copy of the portion of the context associated with the task.

According to at least some example embodiments of the inventive concepts, a processing apparatus for preventing a task-signal deadlock arising due to contention for a mutex in a real-time operating system (RTOS) includes a processor; and a memory communicatively coupled to the processor, wherein the memory stores processor-executable instructions, which, when executed by the processor, cause the processor to detect a signal notification sent to a task for execution of a signal handler, allocate a context of the signal handler above a pre-emption point of the task in a stack associated with the task, identify a mutex to be acquired by the signal handler when the signal notification is detected, determine whether the identified mutex has been acquired by the task, create a copy of the context of the signal handler in response to determining that the identified mutex has been acquired by the task, execute the task such that the task releases the mutex, determine whether a current position of the stack pointed is above a starting point of the context of the signal handler in the stack, and execute the signal handler based on the current position and the starting point, wherein, the processor is configured to execute the signal handler such that, in response to determining that the current position is above the starting point, the execution of the signal handler includes creating a copy of a portion of a context associated with the task that is located between the starting point and the current position, restoring the context of the signal handler in the stack using the copy of the context of the signal handler, for execution of the signal handler, and restoring the context associated with the task into the stack using the copy of the portion of the context associated with the task.

According to at least some example embodiments of the inventive concepts, a method for preventing a task-signal deadlock arising due to contention for a mutex in a real-time operating system (RTOS) includes detecting, by a processing unit, a signal notification sent to a task, for execution of a signal handler; determining whether the mutex has been acquired by the task; in response to determining that the mutex has been acquired by the task, allocating, by the processing unit, a context of the signal handler at a location in a stack associated with the task that is above a pre-emption point of the task such that a starting point of the context of the signal handler and the pre-emption point of the task are separated by a first memory space in the stack, executing, by the processing unit, the task such that the task releases the mutex; and executing, by the processing unit, the signal handler upon execution of the task.

According to at least some example embodiments of the inventive concepts, a processing apparatus for preventing a task-signal deadlock arising due to contention for a mutex in a real-time operating system (RTOS) includes a processor; and a memory communicatively coupled to the processor, wherein the memory stores processor-executable instructions, which, when executed by the processor, cause the processor to detect a signal notification sent to a task, for execution of a signal handler, determine whether the mutex has been acquired by the task, in response to determining that the mutex has been acquired by the task, allocate a context of the signal handler at a location in a stack associated with the task that is above a pre-emption point of the task such that a starting point of the context of the signal handler and the pre-emption point of the task are separated by a first memory space in the stack, execute the task such that the task releases the mutex, and execute the signal handler upon execution of the task.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate at least some example embodiments of the inventive concepts and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 9A:
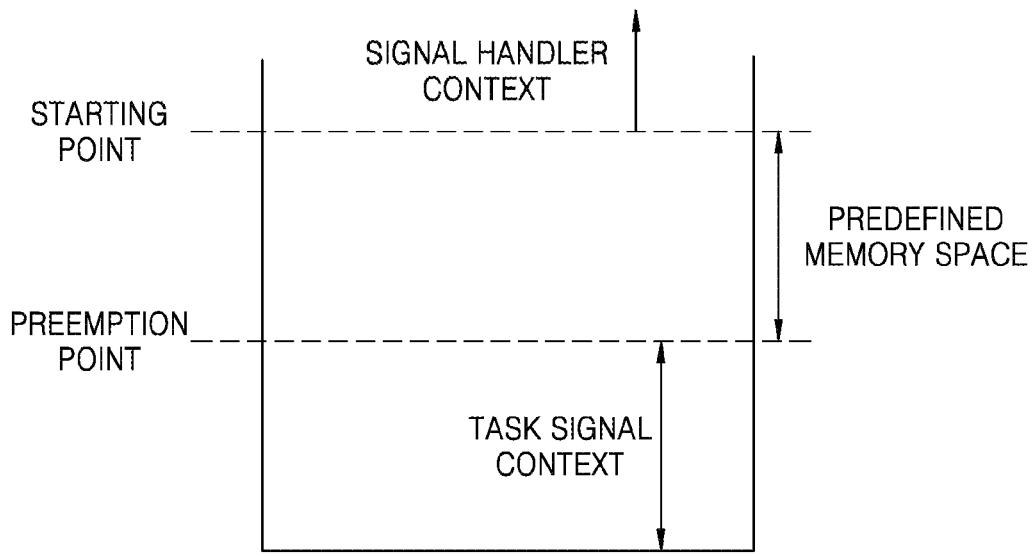
Figure 9B:
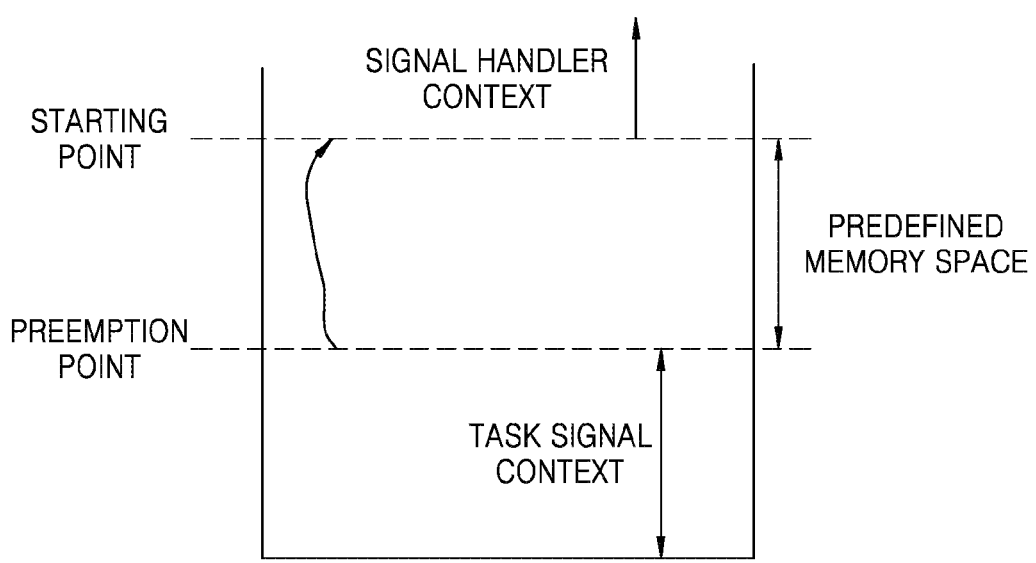
Figure 9C:
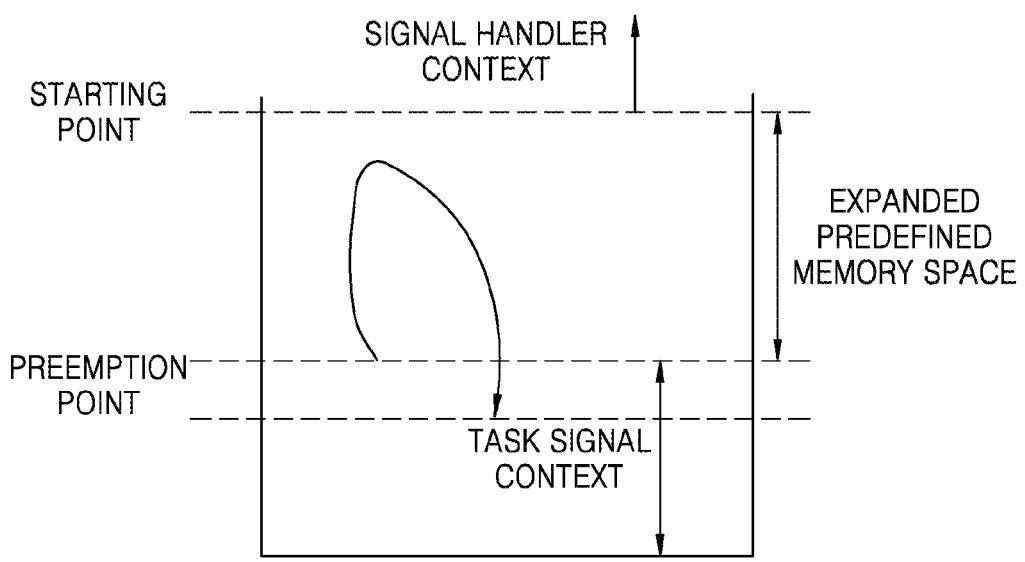
Figure 10:
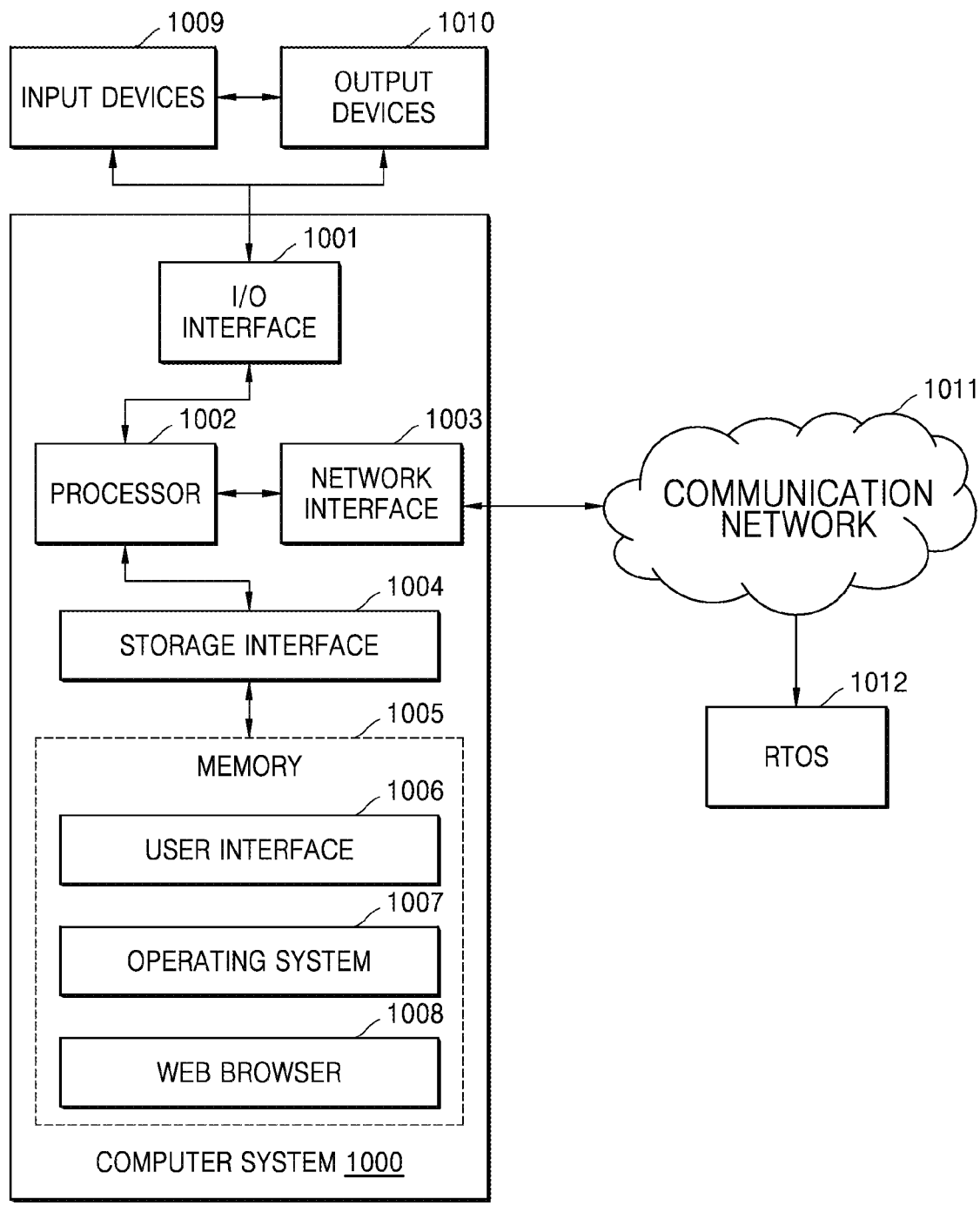

FIGS. 9A-9C are example representations of allocation of the context of the signal handler for illustrating prevention of a task-signal deadlock arising due to contention for a mutex in a RTOS, using a second processing unit, in accordance with some embodiments of present disclosure; and FIG. 10 illustrates a block diagram of an example computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure proposes a method and apparatus for preventing a task-signal deadlock condition arising due to contention of a mutex in a real time operating system (RTOS). According to at least one example embodiment of the inventive concepts, a desired or, alternatively, predefined number of additional stacks in the RTOS are dedicated for execution of signal handlers. When the mutex to be acquired by the signal handler is acquired by a task, the proposed method and apparatus, according to at least one example embodiment of the inventive concepts, includes automatically utilizing an alternative stack from the predefined or, alternatively, desired number of additional stacks, for execution of the signal handler. According to at least one other example embodiment of the inventive concepts, a copy of the context of the signal handler is created when the mutex acquired by the signal handler is acquired by a task. Upon execution of the task and release of the mutex, copy of the context of the signal handler is restored in the stack, for execution of the signal handler. At least one other example embodiment of the inventive concepts includes creating a copy of context of the signal handler when mutex to be acquired by the signal handler is acquired by task, and allocating the context of the signal handler above a predefined or, alternatively, desired, memory space from a pre-emption point of the task. Thus, execution of the task is performed for release of the mutex, without a task-signal deadlock condition.

Figure 1:
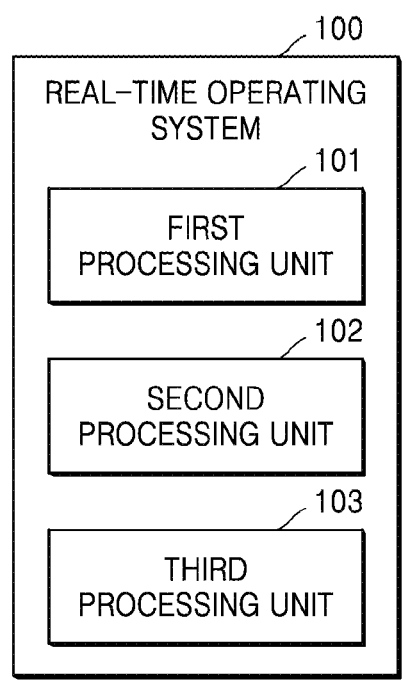
FIG. 1 shows a block diagram of RTOS for preventing a task-signal deadlock arising due to contention for a mutex in the RTOS, in accordance with at least some example embodiments of the inventive concepts.

FIG. 1 shows an example block diagram of a RTOS 100. The RTOS 100 is configured to deal with task-signal deadlock arising due to contention for a mutex. The task-signal deadlock may occur in a scenario where a task is in a critical region and holds a mutex, and the task may send a signal to itself or another task may signal the task. In such a case, the context of the task and the context of signal handler of the signal are stored in same stack and execution of the signal handler is of higher priority. The task may suspend to resume the signal handler of the signal and the context of the signal handler may be stored above the context of the task. When the signal handler tries to acquire the mutex that is acquired by the task, it is required that the task needs to release the mutex for execution of the signal handler. Execution of the task, for the release of the mutex, may not be possible since the context of the signal handler is stored above the context of the task. Also, the signal handler may not be executed due to contention of the mutex, causing the task-signal deadlock.

For the prevention of the task-signal deadlock, the RTOS 100 may comprise a first processing unit 101, a second processing unit 102 and a third processing unit 103. Each of the first processing unit 101, the second processing unit 102 and the third processing unit 103 may be configured prevent the task-signal deadlock arising due to contention for the mutex. According to at least one example embodiment of the inventive concepts, each of the first processing unit 101, the second processing unit 102 and the third processing unit 103 may function in a sequential manner, until the task-signal deadlock is prevented. According to at least one example embodiment of the inventive concepts, the RTOS 100 may implement any one of the first processing unit 101, the second processing unit 102 and the third processing unit 103, for the prevention. According to at least one example embodiment of the inventive concepts, at least one of the first processing unit 101, the second processing unit 102 and the third processing unit 103 may be externally connected to the RTOS 100 via a communication network (not illustrated). The communication network may include, but is not limited to, a direct interconnection, a Peer to Peer (P2P) network, Local Area Network (LAN), Wide Area Network (WAN), wireless network (e.g., using Wireless Application Protocol), Controller Area Network (CAN), the Internet, Wi-Fi, and such. At least one of the first processing unit 101, the second processing unit 102 and the third processing unit 103 may be implemented in a variety of computing systems, such as a laptop computer, a desktop computer, a Personal Computer (PC), a notebook, a smartphone, a tablet, e-book readers, a server, a network server, and the like. According to at least some example embodiments of the inventive concepts, any or all of the first processing unit 101, the second processing unit 102, and the third processing unit 103 may be, or include, processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The first processing unit 101 may include a processor and a memory communicatively coupled to the processor. The memory stores processor-executable instructions, which, on execution, cause the processor to prevent a task-signal deadlock. The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

For the prevention, the first processing unit 101 may be configured to detect a signal notification sent to a task for execution of a signal handler. Upon detection, the first processing unit 101 may be configured to identify a mutex to be acquired by the signal handler. When the mutex is acquired by the task, the first processing unit 101 may be configured to utilize an alternative stack for execution of the signal handler for preventing the task-signal deadlock during the execution. The first processing unit 101 may be configured to automatically utilize the alternative stack without intervention of a developer or user of the RTOS 100. The alternative stack may be selected from a predefined number of additional stacks in the RTOS 100. According to at least one example embodiment of the inventive concepts, the predefined number of additional stacks are dedicated in the RTOS 100 for prevention of the task-signal deadlock.

The second processing unit 102 may comprise a processor and a memory communicatively coupled to the processor. The memory stores processor-executable instructions, which, on execution, cause the processor to prevent a task-signal deadlock. For the prevention, the second processing unit 102 may be configured to detect a signal notification sent to a task for execution of a signal handler. When the signal notification is detected, a context of the signal handler is allocated above a pre-emption point of the task, in a stack associated with the task. Upon detection, the second processing unit 102 may be configured to identify a mutex to be acquired by the signal handler. When the mutex is acquired, the second processing unit 102 may be configured to create a copy of the context of the signal handler. Further, the second processing unit 102 may be configured to execute the task release of the mutex and initiate execution of the signal handler. The execution of signal handler is initiated based on a current position of stack pointer of the task with respect to a starting point of the context of the signal handler in the stack. When the current position is below the starting point, the second processing unit 102 may be configured to execute the signal handler. When the current position is above the starting point, the second processing unit 102 may be configured to execute the signal handler by creating a copy of context associated with the task, between the starting point and the current position. Further, the context of the signal handler is restored in the stack using the copy of the context of the signal handler and the signal handler is executed. Further, the second processing unit 102 may be configured to restore the context associated with the task into the stack using the copy of the context associated with the task. Thus, contention of the mutex acquired by the task is avoided to eliminate the task-signal deadlock.

The third processing unit 103 may comprise a processor and a memory communicatively coupled to the processor. The memory stores processor-executable instructions, which, on execution, cause the processor to prevent a task-signal deadlock. For the prevention, the third processing unit 103 may be configured to detect a signal notification sent to a task for execution of a signal handler. Upon detection, the third processing unit 103 may be configured to identify a mutex to be acquired by the signal handler is acquired by the task. The third processing unit 103 may be configured to allocate context of the signal handler above a predefined memory space from a pre-emption point of the task, in a stack associated with the task. During the allocation, the third processing unit 103 may mark the context of the signal handler as Read-Only (RO). Such that, execution of the task may not utilize memory space comprising the context of the signal handler. The predefined memory space provides an expansion of context of the task. Upon allocation, the third processing unit 103 may be configured to execute the task for the release of the mutex. Further, the third processing unit 103 may be configured to execute the signal handler, to prevent the task-signal deadlock. According to at least one example embodiment of the inventive concepts, the third processing unit 103 may be configured to expand the predefined memory space when position of stack pointer, during execution of the task, is detected to be above starting point of the context of the signal handler. According to at least one example embodiment of the inventive concepts, the expansion may be a dynamic process.

Figure 2:
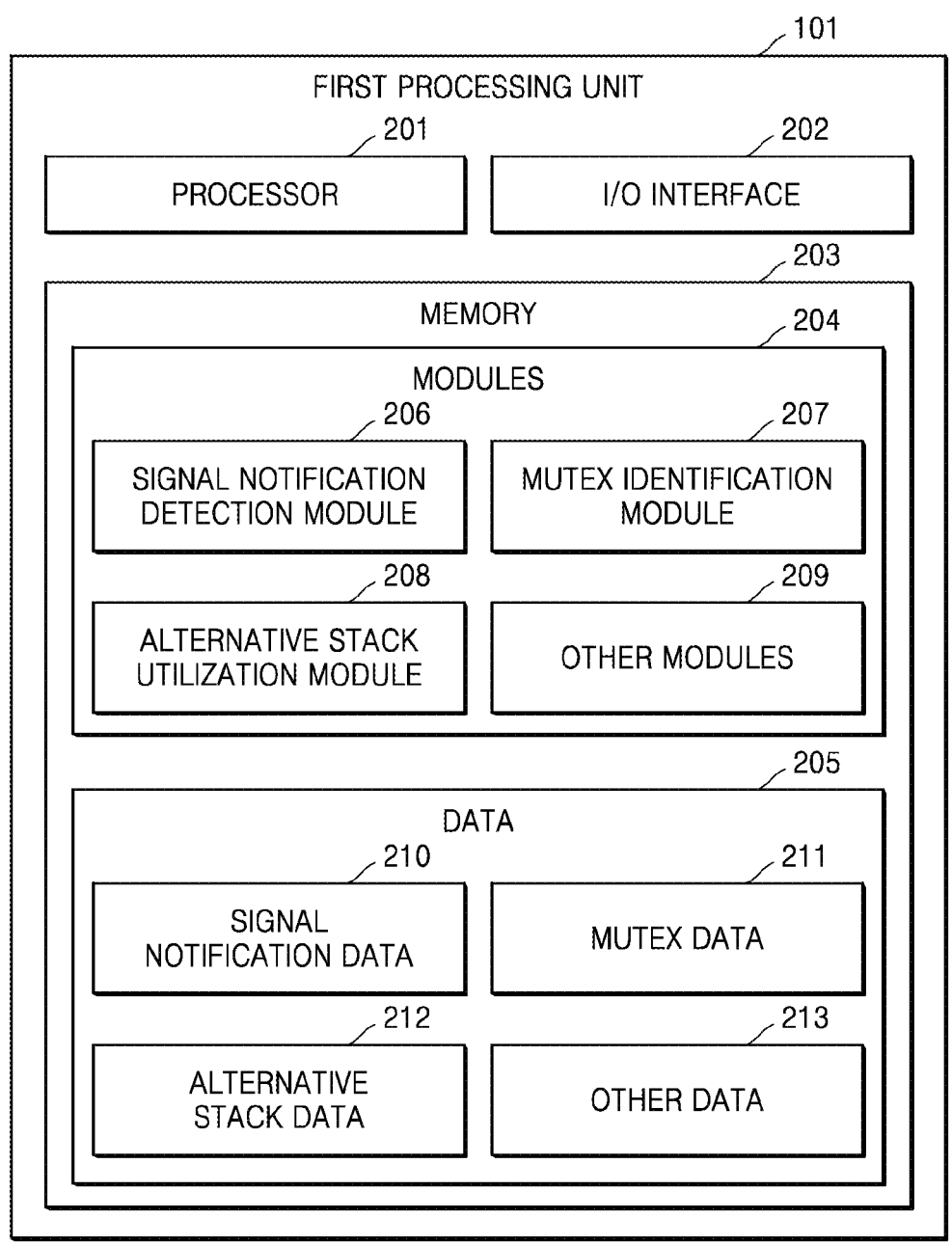
FIG. 2 shows a detailed block diagram of a first processing unit for preventing a task-signal deadlock arising due to contention for a mutex in a RTOS, in accordance with at least some example embodiments of the inventive concepts.

FIG. 2 shows a detailed block diagram of the first processing unit 101 for preventing the task-signal deadlock arising due to contention for a mutex in a RTOS 100, in accordance with at least some example embodiments of the inventive concepts. The first processing unit 101 may comprise a processor 201, I/O interface 202 and a memory 203 communicatively coupled to the processor 201. The memory 203 stores processor-executable instructions, which, on execution, cause the processor 201 to prevent a task-signal deadlock. The memory 203 may comprise modules 204 and data 205.

The data 205 and the one or more modules 204 in the memory 203 of the first processing unit 101 may be described herein in detail.

In one implementation, the one or more modules 204 may include, but are not limited to, a signal notification detection module 206, a mutex identification module 207, an alternative stack utilization module 208, and one or more other modules 209, associated with the first processing unit 101.

According to at least one example embodiment of the inventive concepts, the data 205 in the memory 203 may include signal notification data 210 (also referred to as signal notification 210), mutex data 211 (also referred to as mutex 211), alternative stack data 212, and other data 213 associated with the first processing unit 101.

According to at least one example embodiment of the inventive concepts, the data 205 in the memory 203 may be processed by the one or more modules 204 of the first processing unit 101. According to at least one example embodiment of the inventive concepts, the one or more modules 204 may be implemented as dedicated units and when implemented in such a manner, said modules may be configured with the functionality defined in the present disclosure to result in a novel hardware.

As used in the present specification, the term "module" may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality including, for example processor-executable code which is stored in memory (e.g., memory 203, 403 and/or 703) and may be executed by a processor (e.g., processor 201, 401 and/or 701). For example, according to at least some example embodiments of the inventive concepts, any or all operations described in the present specification as being performed by a module may be performed and/or controlled by a processor executing processor-executable instructions that are stored in memory and correspond to the described operations.

Figure 3:
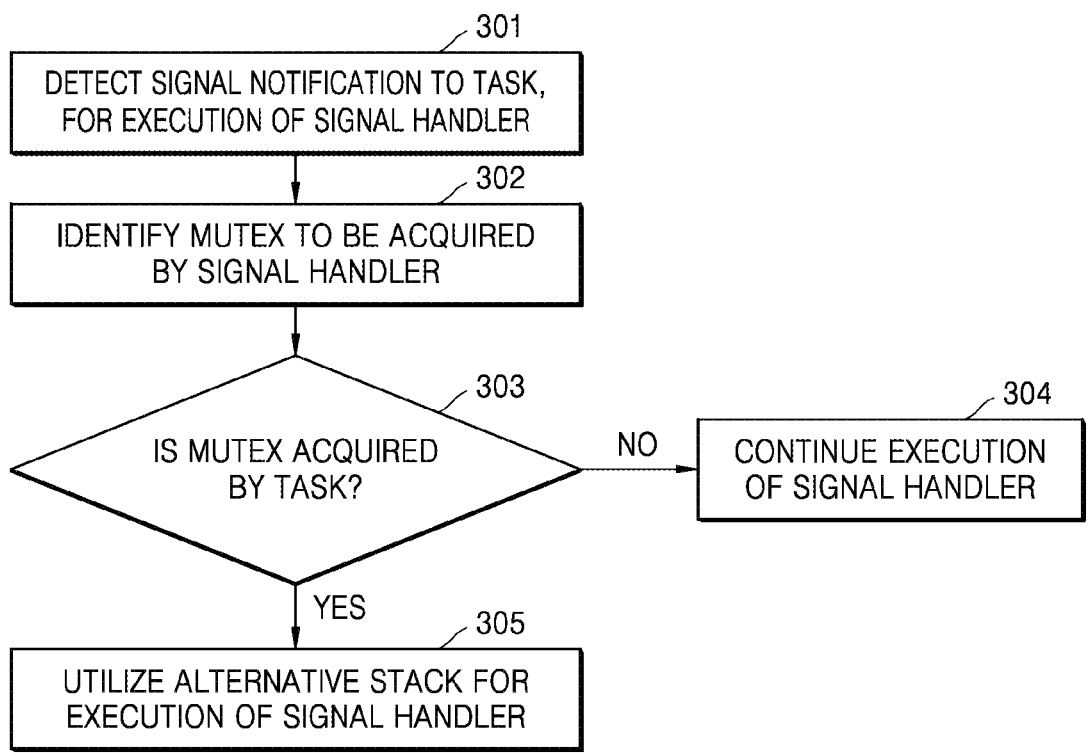
FIG. 3 shows a flow diagram illustrating a method performed by a first processing unit for preventing a task-signal deadlock arising due to contention for a mutex in a RTOS, in accordance with some embodiments of present disclosure.

FIG. 3 shows a flow diagram illustrating an example method performed by the first processing unit 101 for preventing the task-signal deadlock.

At block 301, the signal notification detection module 206 may be configured to detect a signal notification 210 to a task for execution of a signal handler. According to at least one example embodiment of the inventive concepts, the signal notification 210 may arise when the task posts a signal to itself. According to at least one example embodiment of the inventive concepts, the signal notification 210 may arise when another task posts a signal to the task. When the signal notification 210 is detected, the signal handler may be provided with a priority that is higher than that of the task.

At block 302, the mutex identification module 207 may be configured to identify a mutex 211 to be acquired by the signal handler.

At block 303, the mutex identification module 207 checks if the identified mutex 211 is acquired by the task. For example, at block 303, the mutex identification module 207 may determine whether the identified mutex 211 has been acquired by the task. In response to determining that the mutex 211 has not been acquired by the task, the method proceeds to block 304. In response to determining that the mutex 211 has been acquired by the task, the method proceeds to block 305. According to at least one example embodiment of the inventive concepts, when it is detected that the mutex is acquired by the task, the task may be said to be in PROT MODE. According to at least one example embodiment of the inventive concepts, the task is said to be in PROT MODE until the acquired mutex is suspended.

At block 304, when the mutex 211 is not acquired by the task, the mutex identification module 207 may be configured to instruct the first processing unit 101 to continue execution of the signal handler without interruption. In such case, independent to the execution of the task, execution of the signal handler may be performed. According to at least one example embodiment of the inventive concepts, the task and the signal handler may be executed simultaneously.

At block 305, when the mutex 211 is acquired by the task, the alternative stack utilization module 208 may be configured to utilize an alternative stack for execution of the signal handler. The alternative stack may be selected from a predefined number of additional stacks in the RTOS 100. According to at least one example embodiment of the inventive concepts, data/information associated with the alternative stack or the predefined number of additional stacks may be stored as the alternative stack data 212 in the memory 203. According to at least one example embodiment of the inventive concepts, the predefined number of additional stacks are dedicated in the RTOS 100 for prevention of the task-signal deadlock. According to at least one example embodiment of the inventive concepts, the process of allocation of the alternative stack may be automated by a kernel associated with the first processing unit 101. By the automatic and dynamic allocation of the alternative stack, the task-signal deadlock may be prevented in the RTOS 100.

The I/O interface 202 of the first processing unit 101 may assist in transmitting and receiving data. Received data may include, but is not limited to, the signal notification 210, the alternative stack data 212 and so on. Transmitted data may include, but is not limited to, one or more instructions for execution of the task and the signal handler and so on. One or more other data, which is associated with the prevention of the task-signal deadlock, may be received and transmitted via the I/O interface 202.

Using the first processing unit 101, at any given priority, only one task can be active. For example, Shannon OS, like many other RTOS 100, follows First In First Out (FIFO) scheduling for tasks at same priority. Such knowledge may be used allocate, for example, a maximum of N static alternative stacks from the predefined number of stacks, for signal handlers. Here, N may be number of unique priorities in the RTOS 100.

Figure 4:
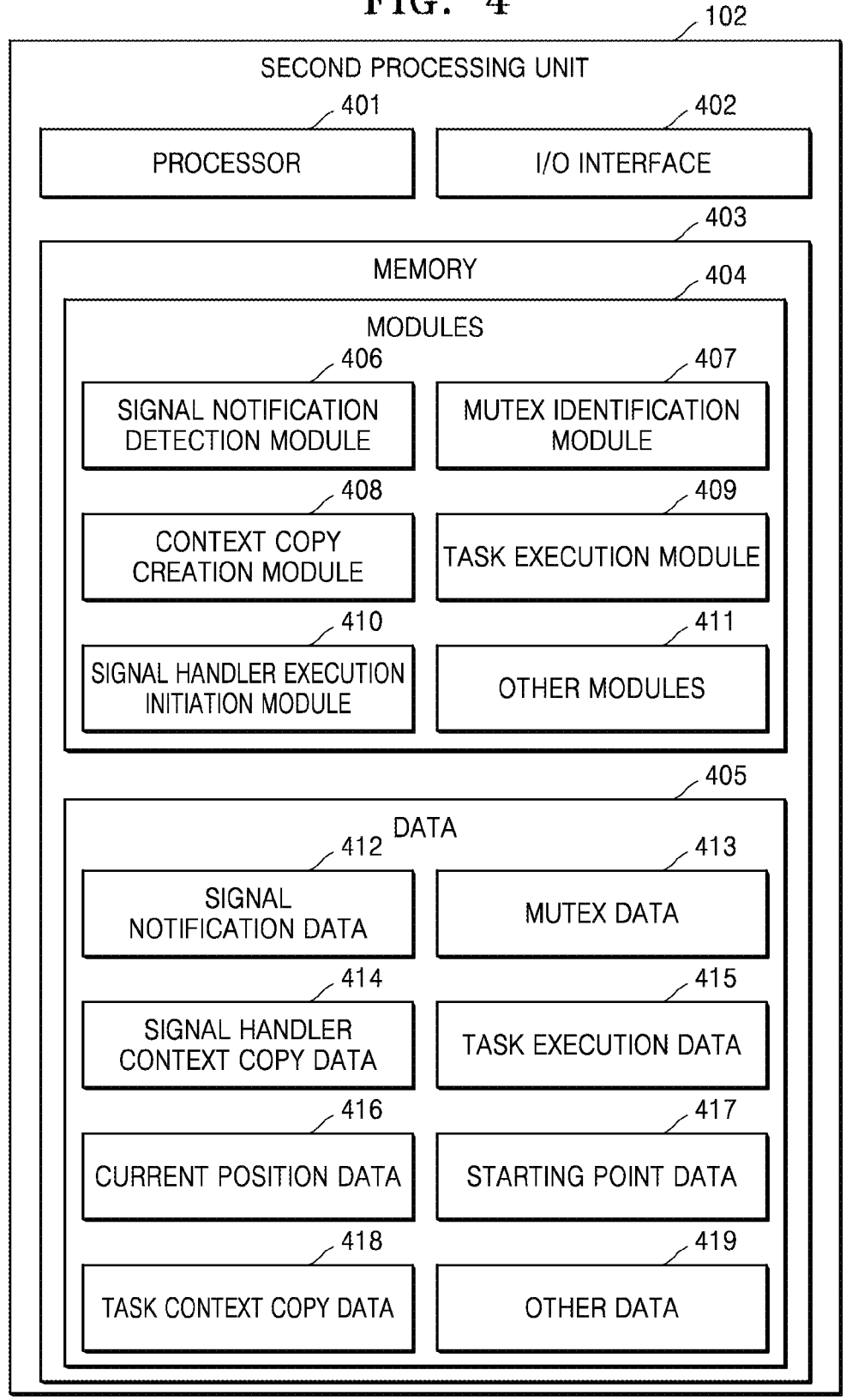
FIG. 4 shows a detailed block diagram of a second processing unit for preventing a task-signal deadlock arising due to contention for a mutex in a RTOS, in accordance with at least some example embodiments of the inventive concepts.

FIG. 4 shows a detailed block diagram of the second processing unit 102 for preventing the task-signal deadlock arising due to contention for a mutex in a RTOS 100, in accordance with at least some example embodiments of the inventive concepts. The second processing unit 102 may comprise a processor 401, I/O interface 402 and a memory 403 communicatively coupled to the processor 401. The memory 403 stores processor-executable instructions, which, on execution, cause the processor 401 to prevent a task-signal deadlock. The memory 403 may comprise modules 404 and data 405. The data 405 and the one or more modules 404 in the memory 403 of the second processing unit 102 may be described herein in detail.

In one implementation, the one or more modules 404 may include, but are not limited to, a signal notification detection module 406, a mutex identification module 407, a context copy creation module 408, a task execution module 409, a signal handler execution initiation module 410 and one or more other modules 411, associated with the second processing unit 102.

According to at least one example embodiment of the inventive concepts, the data 405 in the memory 403 may include signal notification data 412 (also referred to as signal notification 412), mutex data 413 (also referred to as mutex 413), signal handler context copy data 414, task execution data 415, current position data 416 (also referred to as current position 416), starting point data 417 (also referred to as starting point 417), a task context copy data 418 and other data 419 associated with the second processing unit 102.

According to at least one example embodiment of the inventive concepts, the data 405 in the memory 403 may be processed by the one or more modules 404 of the second processing unit 102. According to at least one example embodiment of the inventive concepts, the one or more modules 404 may be implemented as dedicated units and when implemented in such a manner, said modules may be configured with the functionality defined in the present disclosure to result in a novel hardware.

Figure 5A:
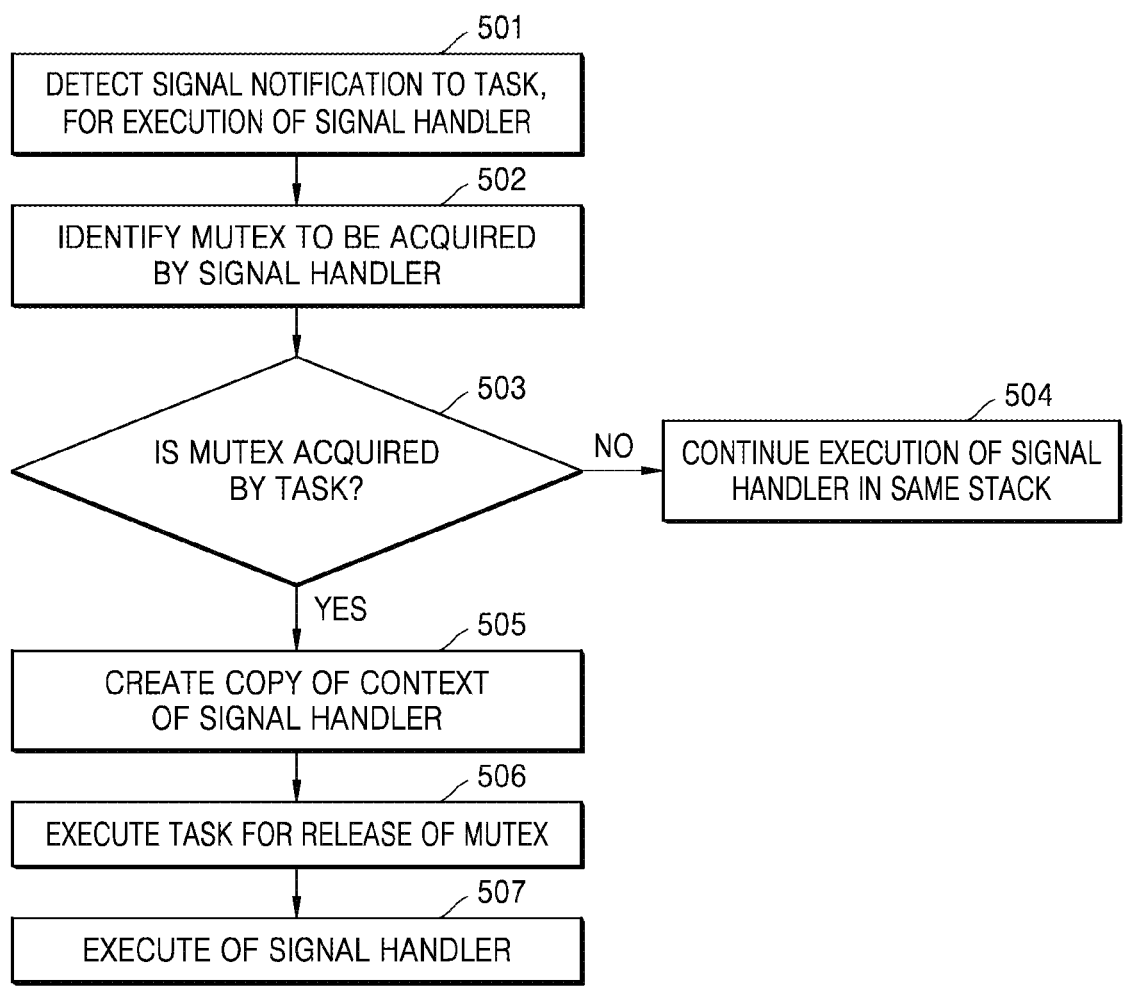
FIGS. 5A and 5B show flow diagrams illustrating methods performed by a second processing unit for preventing a task-signal deadlock arising due to contention for a mutex in a RTOS, in accordance with some embodiments of present disclosure.
Figure 5B:
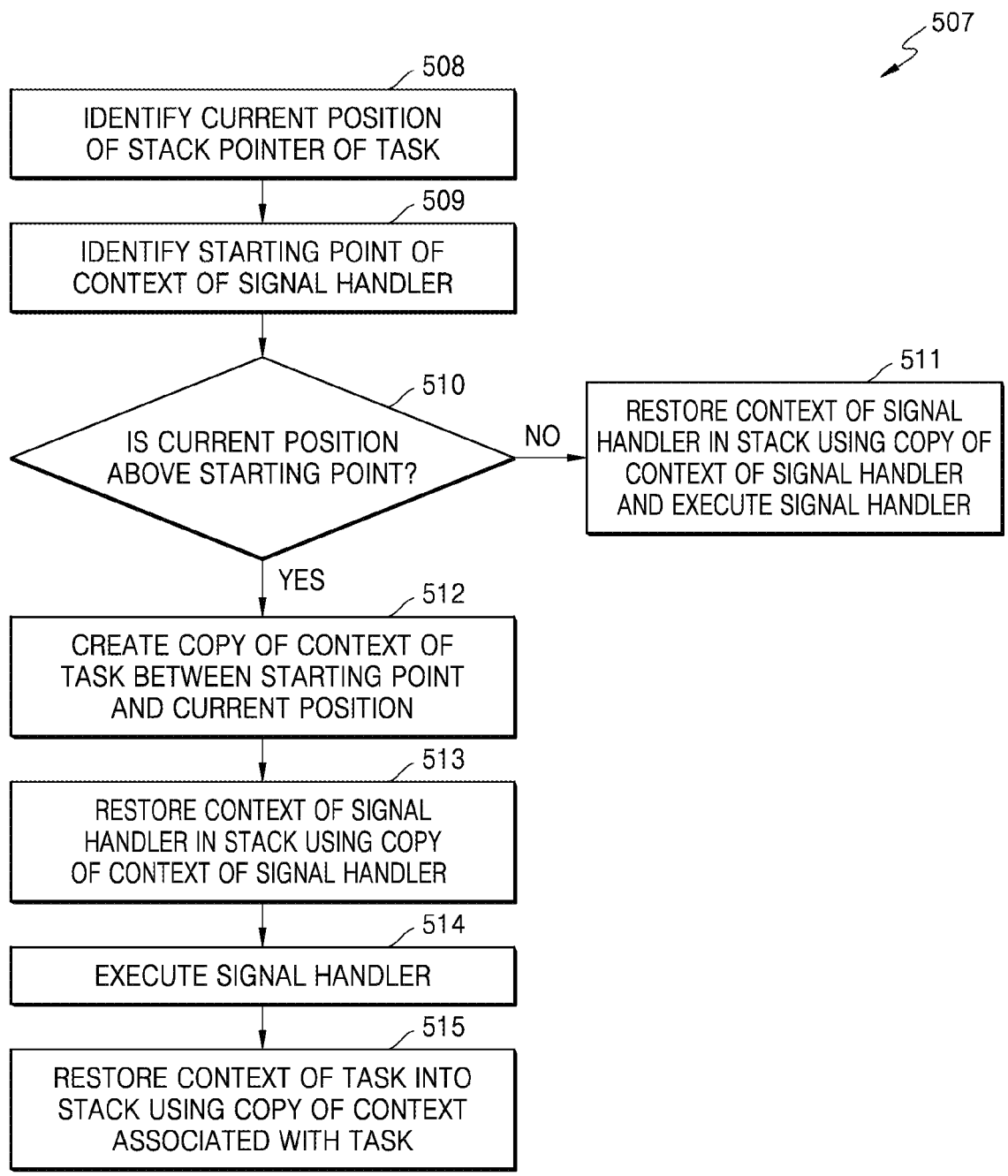

FIG. 5A shows a flow diagram illustrating an example method performed by the second processing unit 102 for preventing the task-signal deadlock.

At block 501, the signal notification detection module 406 may be configured to detect a signal notification 412 to a task for execution of a signal handler. According to at least one example embodiment of the inventive concepts, the signal notification 412 may arise when the task posts a signal to itself. According to at least one example embodiment of the inventive concepts, the signal notification 412 may arise when another task posts a signal to the task. When the signal notification 412 is detected, the signal handler may be provided with a priority that is higher than that of the task. Also, when context associated with the signal handler may be stored is the stack where a context of the task is stored.

Figure 6A:
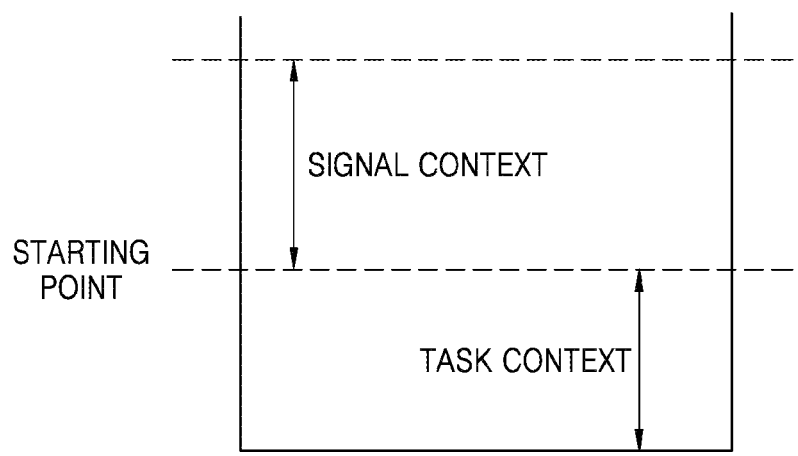
FIGS. 6A-6C show embodiments illustrating prevention of a task-signal deadlock arising due to contention for a mutex in a RTOS, using a second processing unit, in accordance with some embodiments of present disclosure.

Usually, the context of the signal handler may be stored above the context of the task, as shown in FIG. 6A. Starting point 417 of the context of the signal handler in the stack is pre-emption point of the context of the task in the stack.

At block 502, the mutex identification module 407 may be configured to identify a mutex 413 to be acquired by the signal handler.

At block 503, the mutex identification module 407 checks if the identified mutex 413 is acquired by the task. For example, at block 503, the mutex identification module 407 may determine whether the identified mutex 413 has been acquired by the task. In response to determining that the mutex 413 has not been acquired by the task, the method proceeds to block 504. In response to determining that the mutex 413 has been acquired by the task, the method proceeds to block 505.

At block 504, when the mutex 413 is not acquired by the task, the mutex identification module 407 may be configured to instruct the second processing unit 102 to continue execution of the signal handler. In such case, independent to the execution of the task, execution of the signal handler may be performed. According to at least one example embodiment of the inventive concepts, the task and the signal handler may be executed simultaneously.

At block 505, when the mutex 413 is acquired by the task, the context copy creation module 408 may be configured to create a copy of the context of the signal handler from the stack. According to at least one example embodiment of the inventive concepts, copy of the context of the signal handler may be created in a memory unit associated with the RTOS 100. According to at least one example embodiment of the inventive concepts, the memory unit may be associated with the second processing unit 102. The memory unit may be the memory 403 and said copy of the context of the signal handler may be stored as the signal handler context copy data 414.

At block 506, when the mutex 413 is acquired by the task, the task execution module 409 may be configured to execute the task. According to at least one example embodiment of the inventive concepts, the task execution module 409 may be configured to generate one or more instructions for execution of the task. Such instructions may be stored as the task execution data 415 in the memory 403.

At block 507, the signal handler execution initiation module 410 may be configured to execute the signal handler. Initiation of the execution of the signal handler is based on the current position 416 of the stack pointer with respect to a starting point 417 of the context of the signal handler in the stack. According to at least one example embodiment of the inventive concepts, the signal handler execution initiation module 410 may be configured to resume the execution of the signal handler, when the execution is already initiated. FIG. 5A shows a flow diagram illustrating an example method, for initiating the execution of the signal handler, performed by the second processing unit 102.

At block 508, the signal handler execution initiation module 410 may be configured to identify the current position 416 of stack pointer of the task, upon execution of the task. According to at least one example embodiment of the inventive concepts, the signal handler execution initiation module 410 may be configured to monitor the current position 416, upon execution of the task.

At block 509, the signal handler execution initiation module 410 may be configured to identify the stating position of the context of the signal handler.

At block 510, the signal handler execution initiation module 410 may be configured to check if the current position 416 is above the starting point 417. In response to determining that the current position 416 is below the starting point 417, the method may proceed to block 511. In response to determining that the current position 416 is above the starting point 417, the method proceeds to block 512.

Figure 6B:
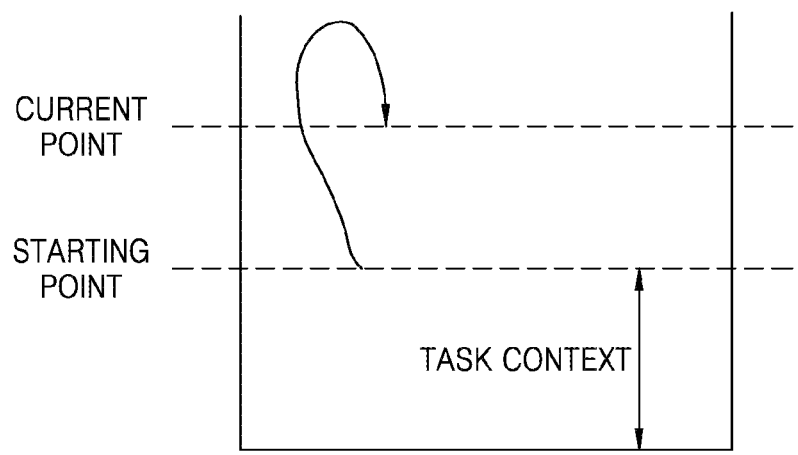
Figure 6C:
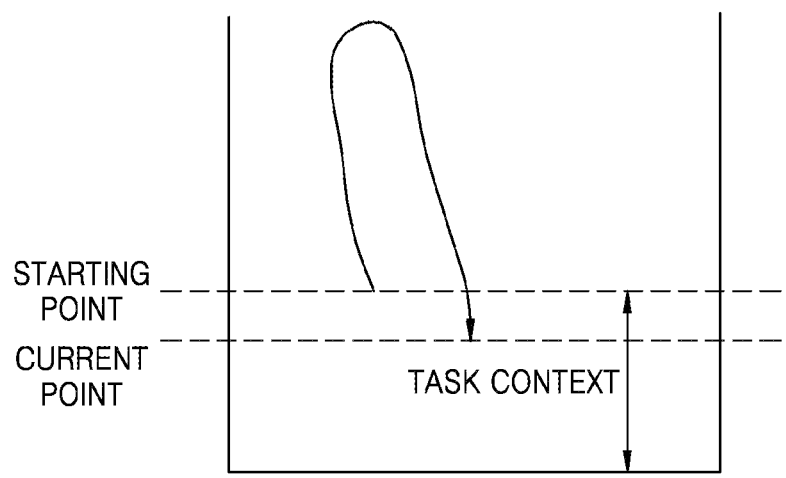

At block 511, when the current position 416 is below the starting point 417 as shown in FIG. 6C, the signal handler execution initiation module 410 may be configured to execute the signal handler. Since, the mutex 413 is already released by executing the task and memory space associated with the context of the signal handler in the stack is not utilized for executing the task, there may be no intervention for executing the signal handler. According to at least one example embodiment of the inventive concepts, the context of the signal handler may be restored in the stack to execute the signal handler.

At block 512, when the current position 416 is above the starting point 417 as shown in FIG. 6B, the signal handler execution initiation module 410 may configured to create a copy of the context of the task between the starting point 417 and the current position 416. According to at least one example embodiment of the inventive concepts, said copy of the context of the task may be created in a memory unit associated with the RTOS 100. According to at least one example embodiment of the inventive concepts, the memory unit may be associated with the second processing unit 102. The memory unit may be the memory 403 and said copy of the context of the signal handler may be stored as the task context copy data 418.

At block 513, the signal handler execution initiation module 410 may be configured to execute restore the context of the signal handler in the stack using the copy of the context of the signal handler. According to at least one example embodiment of the inventive concepts, restoring may include pasting the copy of the context of the signal handler from the starting point 417 of the context of the signal handler.

At block 514, the signal handler execution initiation module 410 may be configured to execute the signal handler. Since the mutex 413 is already released by execution of the task and also the context of the signal handler is restored, the execution of the signal handler may be performed without any intervention.

At block 515, the signal handler execution initiation module 410 may be configured to restore the context of the task into the stack using the copy of the context of the task.

The I/O interface 402 of the second processing unit 102 may assist in transmitting and receiving data. Received data may include, but is not limited to, the signal notification 412, the signal handler context copy data 414, the current position data 416, the starting point data 417, the task context copy data 418 and so on. Transmitted data may include, but is not limited to, one or more instructions for execution of the task and the signal handler and so on. One or more other data, which is associated with the prevention of the task-signal deadlock, may be received and transmitted via the I/O interface 402.

The second processing unit 102 allows the use of the same stack for executing signal handler. Prevention of the task-signal deadlock proposed using the second processing unit 102 may be suitable for instances where occurrences of possible deadlock is very low, to avoid add-on stacks and additional inline checks. Also, using the second processing unit 102, latency associated with the signal handler may be improved. Defer time associated with the signal handler may depend on a duration of critical section, timing of signals and priority inheritance. Hence, the latency may range from few microseconds to multiple milli-seconds. Also, reduction in memory is achieved by using the second processing unit 102. A need for separate memory space for signal handlers may be avoided.

Figure 7:
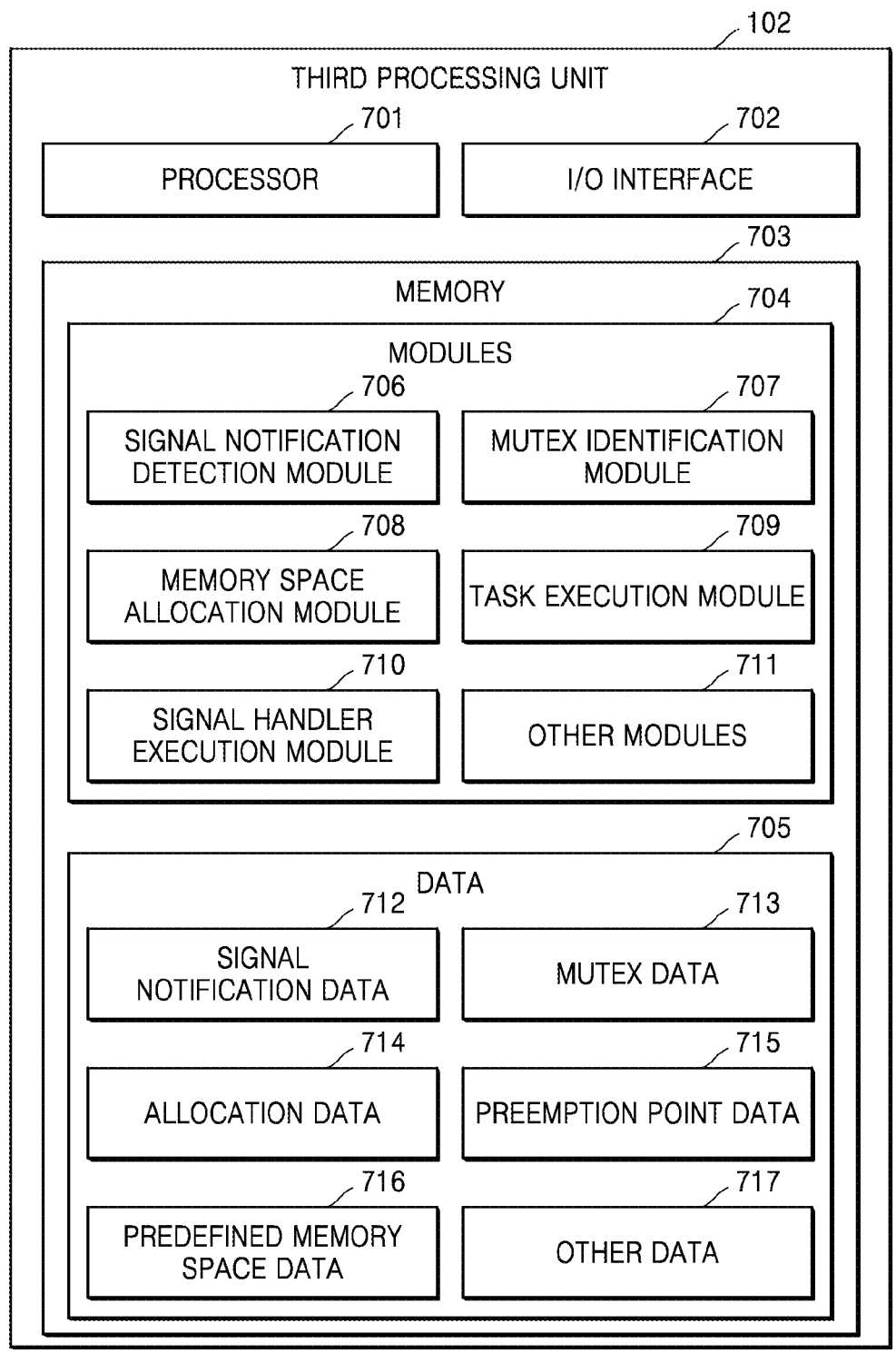
FIG. 7 shows a detailed block diagram of a third processing unit for preventing a task-signal deadlock arising due to contention for a mutex in a RTOS, in accordance with at least some example embodiments of the inventive concepts.

FIG. 7 shows a detailed block diagram of the third processing unit 103 for preventing the task-signal deadlock arising due to contention for a mutex in a RTOS 100, in accordance with at least some example embodiments of the inventive concepts. The third processing unit 103 may comprise a processor 701, I/O interface 702 and a memory 703 communicatively coupled to the processor 701. The memory 703 stores processor-executable instructions, which, on execution, cause the processor 701 to prevent a task-signal deadlock. The memory 703 may comprise modules 704 and data 705. The data 705 and the one or more modules 704 in the memory 703 of the third processing unit 103 may be described herein in detail.

In one implementation, the one or more modules 704 may include, but are not limited to, a signal notification detection module 706, a mutex identification module 707, a memory space allocation module 708, a task execution module 709, a signal handler execution module 710 and one or more other modules 711, associated with the third processing unit 103.

According to at least one example embodiment of the inventive concepts, the data 705 in the memory 703 may include signal notification data 712 (also referred to as signal notification 712), mutex data 713 (also referred to as mutex 713), allocation data 714, pre-emption point data 715 (also referred to as pre-emption point 715), predefined memory space data 716 (also referred to as predefined memory space 716), and other data 717 associated with the third processing unit 103.

According to at least one example embodiment of the inventive concepts, the data 705 in the memory 703 may be processed by the one or more modules 704 of the third processing unit 103. According to at least one example embodiment of the inventive concepts, the one or more modules 704 may be implemented as dedicated units and when implemented in such a manner, said modules may be configured with the functionality defined in the present disclosure to result in a novel hardware.

Figure 8:
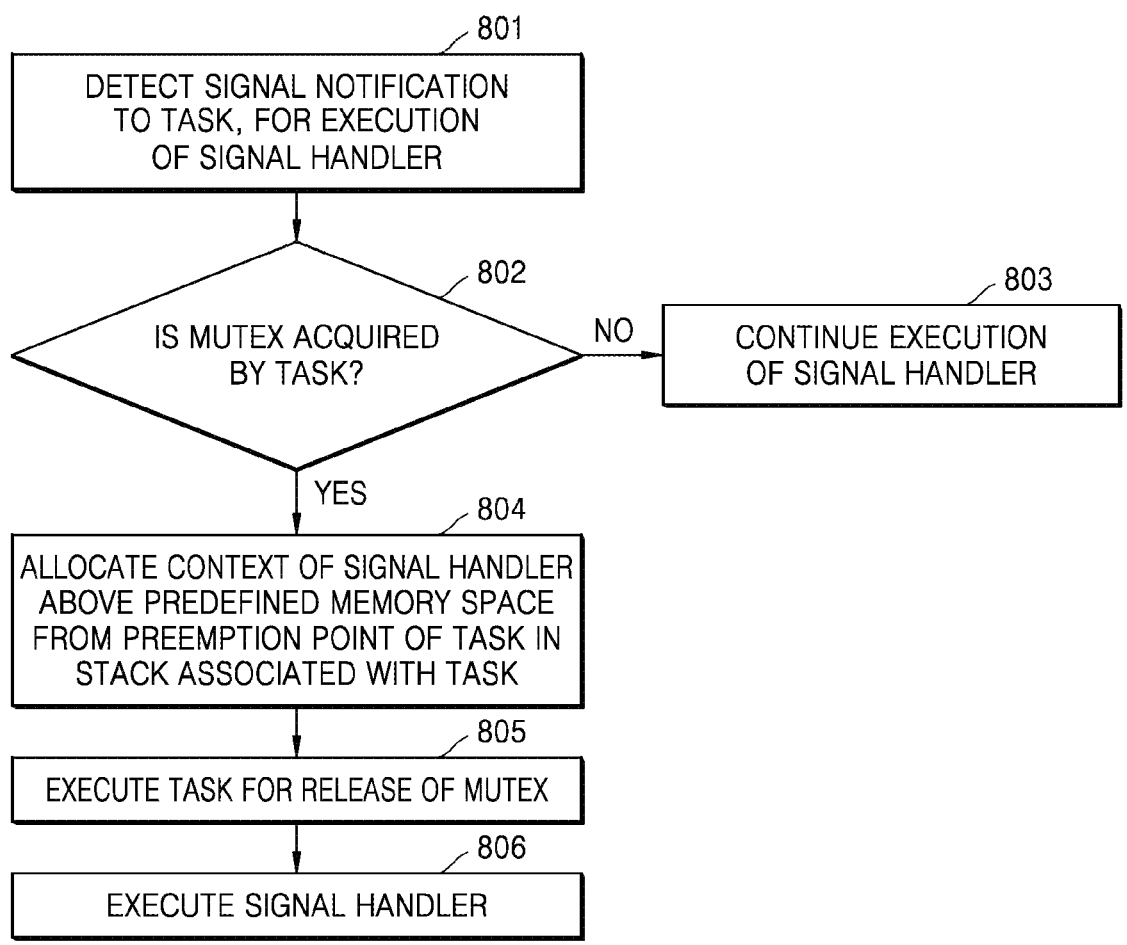
FIG. 8 shows flow diagram illustrating a method performed by a third processing unit for preventing a task-signal deadlock arising due to contention for a mutex in a RTOS, in accordance with some embodiments of present disclosure.

FIG. 8a shows a flow diagram illustrating an example method performed by the third processing unit 103 for preventing the task-signal deadlock.

At block 801, the signal notification detection module 706 may be configured to detect a signal notification 712 to a task for execution of a signal handler. According to at least one example embodiment of the inventive concepts, the signal notification 712 may arise when the task posts a signal to itself. According to at least one example embodiment of the inventive concepts, the signal notification 712 may arise when another task posts a signal to the task. When the signal notification 712 is detected, the signal handler may be provided with a priority that is higher than that of the task.

At block 802, the mutex identification module 707 checks if the identified mutex 713 is acquired by the task. For example, at block 802, the mutex identification module determines whether the identified mutex 713 has been acquired by the task. In response to determining that the mutex 713 has not been acquired by the task, the method proceeds to block 803. In response to determining that the mutex 713 has been acquired by the task, the method proceeds to block 804.

At block 803, when the mutex 713 is not acquired by the task, the mutex identification module 707 may be configured to instruct the second processing unit 102 to continue execution of the signal handler. In such case, independent to the execution of the task, execution of the signal handler may be performed. According to at least one example embodiment of the inventive concepts, the task and the signal handler may be executed simultaneously.

At block 804, when the mutex 713 is acquired by the task, the memory space allocation module 708 may be configured to allocate context of the signal handler above predefined memory space 716 from pre-emption point 715 of the task, in a stack associated with the task. FIG. 9A illustrates an example representation of allocation of the context of the signal handler. During the allocation, the memory space allocation module 708 may be configured to mark the context of the signal handler as Read-Only (RO). Such that, execution of the task may not utilize memory space comprising the context of the signal handler. The predefined memory space 716 provisions expansion of context of the task. According to at least one example embodiment of the inventive concepts, the predefined memory space 716 may be termed as cushion in the stack. According to at least one example embodiment of the inventive concepts, information/data associated with the allocation, may be stored as the allocation data 714 in the memory 703.

At block 805, upon the allocation, the task execution module 709 may be configured to execute the task. According to at least one example embodiment of the inventive concepts, the task execution module 709 may be configured to generate one or more instructions for execution of the task. Upon execution of the task, the mutex 713 may be released. During execution of the task, when the task accesses the context of the signal handle, which is marked as RO, data abort may be triggered. According to at least one example embodiment of the inventive concepts, data abort handler may copy the context of the signal handler to different location, clears RO flag in the stack and resumes execution of the task. This action may be a learning phase applied to correct size of the predefined memory space 716.

At block 806, the signal handler execution module 710 may be configured to execute the signal handler. According to at least one example embodiment of the inventive concepts, the signal handler execution module 710 may be configured to generate one or more instructions for execution of the signal handler. The mutex 713 released by the task may be acquired by the signal handler, for the execution.

According to at least one example embodiment of the inventive concepts, the one or more other modules 711 of the third processing unit 103 may be configured to expand the predefined memory space 716. Consider when position of stack pointer, during execution of the task, is detected to be above starting point of the context of the signal handler as shown in FIG. 9B. In such case, the one or more other modules 711 may dynamically expand the predefined memory space 716 as shown in FIG. 9C.

The I/O interface 702 of the third processing unit 103 may assist in transmitting and receiving data. Received data may include, but is not limited to, the signal notification 712, the pre-emption point data 715, the allocation data 714, the predefined memory space data 716 and so on. Transmitted data may include, but is not limited to, one or more instructions for execution of the task and the signal handler and so on. One or more other data, which is associated with the prevention of the task-signal deadlock, may be received and transmitted via the I/O interface 702.

Methods illustrated in FIGS. 3, 5A, 5B and 8 may include one or more blocks for executing processes in at least one of the first processing unit 101, the second processing unit 102 and the third processing unit 103. The methods illustrated in FIGS. 3, 5A, 5B and 8 may be described in the general context of computer executable instructions. Generally, computer executable instructions can include routines, programs, objects, components, data structures, procedures, modules, and functions, which cause a processor executing the instructions to perform particular functions or implement particular abstract data types.

The order in which the methods illustrated in FIGS. 3, 5A, 5B and 8 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

FIG. 10 illustrates a block diagram of an example computer system 1000 for implementing embodiments consistent with the present disclosure. According to at least one example embodiment of the inventive concepts, the computer system 1000 is used to implement at least one of the first processing unit 101, the second processing unit 102 and the third processing unit 103. The computer system 1000 may include a central processing unit ("CPU" or "processor") 1002. The processor 1002 may include at least one data processor for executing processes in Virtual Storage Area Network. The processor 1002 may include specialized processing units such as, integrated system (bus) controllers, memory management control units, floating point units, graphics processing units, digital signal processing units, etc.

The processor 1002 may be disposed in communication with one or more input/output (I/O) devices 1009 and 1010 via I/O interface 1001. The I/O interface 1001 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.11 n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1001, the computer system 1000 may communicate with one or more I/O devices 1009 and 1010. For example, the input devices 1009 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 1010 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

In some embodiments, the computer system 1000 may include the first processing unit 101. The processor 1002 may be disposed in communication with a communication network (not shown in figure) via a network interface 1003. The network interface 1003 may communicate with the communication network 1011. The network interface 1003 may employ connection protocols including, without limitation, direct connect, Ethernet (e.g., twisted pair 10/100/

1000 Base T), transmission control protocol/internet protocol (TCP/IP), token ring, IEEE 802.11a/b/g/n/x, etc. The communication network 1011 may include, without limitation, a direct interconnection, local area network (LAN), wide area network (WAN), wireless network (e.g., using Wireless Application Protocol), the Internet, etc. Using the network interface 1003 and the communication network 1011, the computer system 1000 may communicate with a RTOS 1012, for preventing the task-signal deadlock. The network interface 1003 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 1011 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 1002 may be disposed in communication with a memory 1005 (e.g., RAM, ROM, etc. not shown in FIG. 10) via a storage interface 1004. The storage interface 1004 may connect to memory 1005 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 1005 may store a collection of program or database components, including, without limitation, user interface 1006, an operating system 1007, web browser 1008 etc. In some embodiments, computer system 1000 may store user/application data, such as, the data, variables, records, etc., as described in this disclosure. Such databases may be implemented as fault-tolerant, relational, scalable, secure databases such as Oracle® or Sybase®.

The operating system 1007 may facilitate resource management and operation of the computer system 1000. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 1000 may implement a web browser 1008 stored program component. The web browser 1008 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 1008 may utilize facilities such as AJAX, DHTML, Adobe Flash, JavaScript, Java, Application Programming Interfaces (APIs), etc. In some embodiments, the computer system 1000 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 1000 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. For example, the processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 5A, 5B and 8 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Real-time operating system |
| 101 | First processing unit |
| 102 | Second processing unit |
| 103 | Third processing unit |
| 201 | Processor |
| 202 | I/O interface |
| 203 | Memory |
| 204 | Modules |
| 205 | Data |
| 206 | Signal notification detection module |
| 207 | Mutex identification module |
| 208 | Alternative stack utilization module |
| 209 | Other modules |
| 210 | Signal notification data |
| 211 | Mutex data |
| 212 | Alternative stack data |
| 213 | Other data |
| 401 | Processor |
| 402 | I/O interface |
| 403 | Memory |
| 404 | Modules |
| 405 | Data |
| 406 | Signal notification detection module |
| 407 | Mutex identification module |
| 408 | Context copy creation module |
| 409 | Task execution module |
| 410 | Signal handler execution initiation module |
| 411 | Other modules |
| 412 | Signal notification data |
| 413 | Mutex data |
| 414 | Signal handler context copy data |
| 415 | Task execution data |
| 416 | Current position data |
| 417 | Starting point data |
| 418 | Task context copy data |
| 419 | Other data |
| 701 | Processor |
| 702 | I/O interface |
| 703 | Memory |
| 704 | Modules |
| 705 | Data |
| 706 | Signal notification detection module |
| 707 | Mutex identification module |
| 708 | Memory space allocation module |
| 709 | Task execution module |
| 710 | Signal handler execution module |
| 711 | Other modules |
| 712 | Signal notification data |
| 713 | Mutex data |
| 714 | Allocation data |
| 715 | Pre-emption point data |
| 716 | Predefined memory space |
| 717 | Other data |
| 1000 | Computer System |
| 1001 | I/O Interface |
| 1002 | Processor |
| 1003 | Network Interface |
| 1004 | Storage Interface |
| 1005 | Memory |
| 1006 | User Interface |
| 1007 | Operating System |
| 1008 | Web Browser |
| 1009 | Input Devices |
| 1010 | Output Devices |
| 1011 | Communication Network |
| 1012 | RTOS |

We claim:

1. A processing apparatus for preventing a task-signal deadlock arising due to contention for a mutex in a real-time operating system (RTOS), the processing apparatus comprising:

a processor; and
a memory communicatively coupled to the processor, wherein the memory stores processor-executable instructions, which, when executed by the processor, cause the processor to:
   detect a signal notification sent to a task, for execution of a signal handler of the task,
   identify the mutex to be acquired by the signal handler when the signal notification is detected,
   determine whether the mutex has been acquired by the task, and
   prevent the task-signal deadlock by using an alternative stack for execution of the signal handler, in response to determining that the mutex has been acquired by the task.

2. The processing apparatus of claim 1, wherein the alternative stack is selected from a first number of additional stacks in the RTOS.

3. The processing apparatus of claim 2, wherein the first number is a predefined number, and the predefined number of additional stacks are dedicated for the prevention of the task-signal deadlock.

4. The processing apparatus of claim 1, wherein the signal handler is provided with a priority that is higher than that of the task.

5. The processing apparatus of claim 1, wherein the processor-executable instructions further cause the processor to continue execution of the task without interruption in response to determining that the mutex has not been acquired by the task.

6. The processing apparatus of claim 1, wherein the alternative stack is automatically allocated by the processor.

7. The processing apparatus of claim 1, wherein a stack is associated with the task and the alternative stack for execution of the signal handler is different than the stack associated with the task.

8. A processing apparatus for preventing a task-signal deadlock arising due to contention for a mutex in a real-time operating system (RTOS), the processing apparatus comprising:
   a processor; and
   a memory communicatively coupled to the processor, wherein the memory stores processor-executable instructions, which, when executed by the processor, cause the processor to:
      detect a signal notification sent to a task for execution of a signal handler of the task,
      allocate a context of the signal handler above a pre-emption point of the task in a stack associated with the task,
      identify the mutex to be acquired by the signal handler when the signal notification is detected,
      determine whether the identified mutex has been acquired by the task,
      create a copy of the context of the signal handler in response to determining that the identified mutex has been acquired by the task,
      execute the task such that the task releases the mutex,
      determine whether a current position of the stack pointed is above a starting point of the context of the signal handler in the stack, and
      execute the signal handler based on the current position and the starting point.

9. The processing apparatus of claim 8, wherein, the processor is configured to execute the signal handler such that, in response to determining that the current position is above the starting point, the execution of the signal handler includes:
   creating a copy of a portion of a context associated with the task that is located between the starting point and the current position,
   restoring the context of the signal handler in the stack using the copy of the context of the signal handler, for execution of the signal handler, and
   restoring the context associated with the task into the stack using the copy of the portion of the context associated with the task.

10. The processing apparatus of claim 8, wherein the processor is configured to continue execution of the task without interruption in response to determining that the identified mutex has not been acquired by the task.

11. The processing apparatus of claim 8, wherein the starting point of the context of the signal handler is a pre-emption point of the context of the task in the stack.

12. The processing apparatus of claim 8, wherein the signal handler is provided with a priority that is higher than that of the task.

13. The processing apparatus of claim 8, wherein the processor-executable instructions are configured to cause the processor to, in response to determining that the current position is not above the starting point, restore the context of the signal handler in the stack using the copy of the context of the signal handler, and execute the signal handler.

14. A processing apparatus for preventing a task-signal deadlock arising due to contention for a mutex in a real-time operating system (RTOS), the processing apparatus comprising:
   a processor; and
   a memory communicatively coupled to the processor, wherein the memory stores processor-executable instructions, which, when executed by the processor, cause the processor to:
      detect a signal notification sent to a task, for execution of a signal handler of the task,
      determine whether the mutex has been acquired by the task,
      in response to determining that the mutex has been acquired by the task, allocate a context of the signal handler at a location in a stack associated with the task that is above a pre-emption point of the task such that a starting point of the context of the signal handler and the pre-emption point of the task are separated by a first memory space in the stack,
      execute the task such that the task releases the mutex, and
      execute the signal handler upon execution of the task.

15. The processing apparatus of claim 14, wherein the processor is further configured to expand a memory space associated with the task in the stack in response to determining that a position of a stack pointer, during execution of the task, is above the starting point of the context of the signal handler.

16. The processing apparatus of claim 14, wherein the processor is further configured such that the allocating of the context of the signal handler includes designating the context of the signal handler as read-only (RO).

17. The processing apparatus of claim 14, wherein the processor is further configured to continue execution of the task without interruption in response to determining that the mutex has not been acquired by the task.

18. The processing apparatus of claim 14, wherein the signal handler is provided with a priority that is higher than that of the task.

\* \* \* \* \*